US012768065B2

(12) United States Patent
Gutierrez Castillo et al.

(10) Patent No.: US 12,768,065 B2
(45) Date of Patent: Oct. 20, 2026

(54) METAL ELECTRODEPOSITION METHOD AND ELECTROLYTIC MEDIUM FOR ELECTRODEPOSITION

(71) Applicant: DRYLYTE, S.L., Barcelona (ES)

(72) Inventors: Joan David Gutierrez Castillo, Barcelona (ES); Marc Soto Hernandez, Barcelona (ES); Marc Sarsanedas Gimpera, Barcelona (ES)

(73) Assignee: DRYLYTE, S.L., Barcelona (ES)

( * ) Notice: Subject to any disclaimer, the term of this patent is extended or adjusted under 35 U.S.C. 154(b) by 539 days.

(21) Appl. No.: 18/279,433

(22) PCT Filed: Mar. 2, 2022

(86) PCT No.: PCT/ES2022/070112

§ 371 (c)(1),
(2) Date: Aug. 30, 2023

(87) PCT Pub. No.: WO2022/184956

PCT Pub. Date: Sep. 9, 2022

(65) Prior Publication Data

US 2024/0133071 A1 Apr. 25, 2024
US 2024/0229281 A9 Jul. 11, 2024

(30) Foreign Application Priority Data

Mar. 3, 2021 (ES) .................................. 202130186

(51) Int. Cl.
*C25D 5/08* (2006.01)
*B05D 1/04* (2006.01)
(Continued)

(52) U.S. Cl.
CPC ............... *C25D 5/08* (2013.01); *C25D 5/003* (2013.01); *C25D 5/026* (2013.01); *C25D 17/12* (2013.01); *B05D 1/04* (2013.01)

(58) Field of Classification Search
CPC .......... B05D 1/04; B05D 1/007; C25D 5/003; C25D 5/026; C25D 5/08; C25D 17/12
See application file for complete search history.

(56) References Cited

U.S. PATENT DOCUMENTS 3,637,473 A 1/1972 Greenspan et al.
3,676,308 A 7/1972 Brown
(Continued)

FOREIGN PATENT DOCUMENTS

CN 101573212 A 11/2009
EP 0339464 A1 11/1989
(Continued)

OTHER PUBLICATIONS

Int'l Search Report for PCT/ES2022/070112, dated May 20, 2022.

*Primary Examiner* — Brian W Cohen
(74) *Attorney, Agent, or Firm* — Edell, Shapiro & Finnan, LLC

(57) ABSTRACT

An electrodeposition process for electrodeposition of a metal on a metal part (1), includes the connection of the metal part (1) to be treated to a first electrical pole of a current generator and a second pole opposite the first pole connected to the electrolytic medium through an electrode (3), and includes relative movement of the metal part (1) in relation to a set of free solid particles (4) that retain a conductive solution. The solution includes metal cations of the metal to be deposited charged with a positive electrical charge in a non-conductive environment (5) that causes the reduction of the metal cations of the conductive solution on the surface of the metal part to be treated (1). An electrolytic medium for electrodeposition of a metal on a metal part (1) is also provided.

15 Claims, 1 Drawing Sheet

(51) Int. Cl.
*C25D 5/00* (2006.01)
*C25D 5/02* (2006.01)
*C25D 17/12* (2006.01)

(56) References Cited

U.S. PATENT DOCUMENTS

| | | | | |
|---|---|---|---|---|
| 7,208,073 | B1 * | 4/2007 | Hradil .................. | C25D 17/005<br>205/255 |
| 7,951,428 | B2 * | 5/2011 | Hoerr ..................... | C25D 5/003<br>427/479 |
| 10,683,583 | B2 * | 6/2020 | Sarsanedas Millet .... | C25F 3/16 |
| 2012/0245019 | A1 | 9/2012 | Adzic et al. | |

FOREIGN PATENT DOCUMENTS

| | | | |
|---|---|---|---|
| EP | 3372711 | A1 | 9/2018 |
| ES | 2818473 | A1 | 4/2021 |
| GB | 1406081 | A | 9/1975 |

* cited by examiner

METAL ELECTRODEPOSITION METHOD AND ELECTROLYTIC MEDIUM FOR ELECTRODEPOSITION

OBJECT OF THE INVENTION

The invention, as expressed by the title of the present specification, relates to an electrodeposition process for electrodeposition of a metal on a metal part by ion transport by means of a set of free solid particles (4) that retain a conductive solution comprising metal ions of the metal to be deposited and to the electrolytic medium for electrodeposition of a metal on a metal part, providing novel advantages and characteristics that will be described in detail below and that represent a notable improvement compared to what is currently known in its field of application.

The first object of the present invention relates, specifically, to an electrodeposition process for electrodeposition of a metal on a metal part, based on ion transport by means of a set of free particles or solid bodies of a reduced size, which is distinguished essentially by the fact that the particles are electrically conductive and retain a conductive solution comprising metal ions of the metal to be deposited and are incorporated together in a non-conductive environment, arranging the metal part to be treated in such a way that they are connected to the negative pole of an electrical power source, for example a direct current generator and, preferably, presenting relative motion with respect to the set of particles, and the set of particulate bodies so that they make electrical contact with the positive pole of the power source.

A second object of the invention relates to the electrolytic medium for electrodeposition of a metal on a metal part comprising a set of free solid particles that retain a conductive solution comprising metal ions of the metal to be deposited.

FIELD OF APPLICATION OF THE INVENTION

The field of application of the present invention falls within the industry sector dedicated to the treatment of metal surfaces, covering especially electrodeposition processes.

BACKGROUND OF THE INVENTION

Electrodeposition, also known as galvanizing or electroplating, is an electrochemical treatment of metal parts or metal surfaces to form a metallic coating on a base part with the aim of modifying the surface properties of the part. Electrodeposition is used to improve the surface properties of the part, such as corrosion resistance, wear resistance, or the aesthetic finish.

Conventional electrodeposition is based on the reduction of metal cations in a liquid electrolytic medium on the surface of the part caused by the passage of a direct electric current.

The electric current, supplied by an external power source, occurs between the part to be coated connected to the negative pole or cathode, and the electrolytic liquid connected to the positive pole or anode. This electric current causes the reduction of the cations of the electrolytic solution in the form of a metallic coating on the surface of the part that is in contact with the electrolytic liquid.

Once the electrodeposition process has ended, cleaning steps are generally required in which the already coated part must be washed to remove surface residues.

The electrolytic media associated with the conventional electrodeposition process are highly polluting because they include metal cations, often media such as strong acids, cyanides, etc., as well as other chemical reagents used to increase the quality of the coating. The liquids for the treatment of the part in the process before and after electrodeposition are also usually highly polluting. Consequently, handling these liquids represents a safety and environmental pollution risk. It would be desirable to have an electrolytic that represents a lower risk of safety and environmental contamination.

The key parameters for the evaluation of the coating generated by an electrodeposition process are the thickness and the homogeneity of the coating.

Electrodeposition processes usually generate coatings with thicknesses between 1 and 50 microns. However, this thickness is not constant throughout the part since non-homogeneous distributions of the coating are usually observed. with unequal thicknesses in different areas. The most exposed portions, that is, the outermost portions of the part, receive more electrical density and consequently the degree of material deposition in the electrodeposition process is more accentuated, thus generating a thicker coating. This defect is especially visible on the edges and vertices of the part treated by conventional electrodeposition where dendrites grow as a consequence of the tip effect. It would be interesting to have an electrodeposition process that generates a more homogeneous distribution of the coating.

The speed of the electrodeposition processes known to date is physically limited by the formation of the Nernst diffusion layer. This layer describes the ion diffusion process between the part and the liquid electrolyte. Despite increasing the voltage, the speed of the process is limited by the mobility of the ions in the liquid medium. This is a well-studied and known intrinsic limitation of the electrodeposition process with liquid electrolytes, and electrochemical processes in liquid medium in general. It would, therefore, be desirable to have an electrodeposition process that avoids the formation of the Nernst diffusion layer.

As mentioned, the part to be coated by electrodeposition is connected to the negative pole to cause the reduction of the metal cations of the electrolyte. Under these circumstances, the protons of the liquid electrolyte, usually aqueous, compete with the cations of the liquid electrolyte in the reduction process in an unwanted side reaction. These protons are reduced to atomic hydrogen, which tends to diffuse into the metal and accumulate in intergranular spaces and defects in the metal. At these points, atomic hydrogen can recombine to form dihydrogen gas, increasing the brittleness of the material, creating cracks and causing the part to break with virtually no deformation. This process, known as hydrogen embrittlement, is one of the great concerns of the industry, especially in steels, titanium and copper. To correct this process, the parts are usually treated with long processes in the furnace to remove the hydrogen formed during conventional electrodeposition. It would be interesting to have an electrodeposition process that avoids the generation of atomic hydrogen.

Obtaining thin layers of metals is usually done by means of concentrated liquid solutions of metals and catalysts. These liquids are usually corrosive, toxic and polluting in nature. It would be interesting to have an electrolyte that does not splash or spill easily in order to improve the safety of its users, as well as with the aim of improving its recyclability.

Usually, industrial electrodeposition processes require high temperatures to be efficient, which represents an extra energy cost. It would be desirable to have an electrodeposition process that does not require high temperatures to be efficient.

Other possibilities include physicochemical processes such as PVD or CVD to obtain high quality thin layers. In these processes, the deposition is carried out under a vacuum, which hinders the process. They are appropriate systems on a laboratory scale, but they are not applicable on an industrial scale. It would be desirable to have an electrodeposition process that allows high quality thin layers to be obtained without the need to work under a vacuum.

The objective of the present invention is, therefore, to develop an improved electrodeposition process for electrodeposition of a metal on a metal part, as well as an electrolyte for said electrodeposition process that is effective and avoids the drawbacks and problems described above, where it should be noted that, at least on the part of the applicant, the existence of any other process of this type or a similar invention that presents the same features, as claimed, is unknown.

SUMMARY DESCRIPTION OF THE INVENTION

The electrodeposition process for electrodeposition of a metal on a metal part by means of a set of free solid particles that retain a conductive solution comprising metal ions of the metal and the electrolytic medium for electrodeposition of a metal on a metal part that includes a set of free solid particles that retain a conductive solution comprising metal ions of the metal to be deposited, proposed by the invention, are, therefore, a novelty within their field of application, since, according to their implementation, the previously indicated objectives are satisfactorily achieved, with the characterizing details that make it possible and distinguish them being conveniently included in the final claims that accompany the present description.

BRIEF DESCRIPTION OF THE DRAWINGS

To complement the description that is being made and for the purpose of helping to better understand the features of the invention, a sheet of drawings has been attached to the present specification, as an integral part thereof, wherein the following has been depicted in an illustrative and non-limiting manner.

ELECTRODEPOSITION PROCESS

Figure 1:
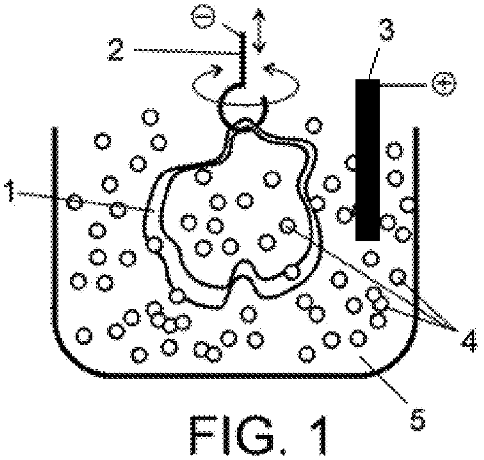
FIG. 1 shows a schematic depiction of the main elements involved in the electrodeposition process for electrodeposition of metals by ion transport by means of free solid bodies, object of the invention.

The electrodeposition process for electrodeposition of a metal on a metal part, object of the invention, comprises the following steps

- connection of the metal part (1) to be treated to a first pole, generally the negative pole (cathode), of a current generator
- connection of the electrolytic medium to a second pole, generally the positive pole (anode), of a current generator through an electrode (3)
- relative movement of the metal part (1) in relation to a set of free solid particles (4) that retain a conductive solution comprising metal ions of the metal to be deposited charged with a negative electrical charge in a non-conductive environment (5) that causes the reduction of the metal cations of the conductive solution on the surface of the metal part to be treated (1)

The process described in this invention could be, for example, as follows: a part to be coated is connected to the negative pole of a power source and is submerged in a container containing an electrolytic medium made up of a set of solid electrolyte particles. The positive pole of the power source is connected to an electrode (3) which is also located in the container. The set of solid electrolyte particles contains ions of the metal to be deposited and/or the anode is made of the metal to be deposited. The process requires a relative movement of the part to be treated with respect to the particles of the electrolytic medium, either by displacement of the part in the medium, by vibration, by spraying or impulsion of the particles, etc., which continuously renews the particles in direct contact with the part. An electric current is circulated between the part (1) and the electrode (3) through the electrolytic medium that causes redox reactions that result in the electrodeposition of metal on the part to be treated.

This electrodeposition process by means of a solid electrolyte has technical effects that clearly differentiate this process from conventional processes:

- In this process, the electrolytic medium does not contact the entire surface as a liquid does, but only makes point contact when there is a contact between a particle and the surface. This concentrates the electrical density at contact points with a high electrodeposition efficiency.
- This invention avoids the kinetic limitations imposed by diffusion layers in the vicinity of the electrodes that occur in conventional processes using a liquid medium. The diffusion layers represent a gradient of the ion concentration in the liquid in the vicinity of the electrode. Since the concentration of the cation to be deposited is lower in the vicinity of the anode with respect to that of the liquid as a whole, this in fact represents a limitation to the electrodeposition speed. In the process presented by this invention, as the particles in direct contact are constantly being renewed, it does not allow time for these diffusion layers to form.
- As the electrical contact point between the particles with the conductive solution and the surface are not stable over time, the formation of hydrogen gas on the surface of the part-cathode is hindered.
- One of the most relevant advantages in terms of part finishes is that the metal is deposited at the particle-part contact points. As these points are changing, the formation of dendrites due to the tip effect is avoided.

In a preferred embodiment, the process may also include a step of control of the electrodeposition process where the polarity of the current generator is reversed, that is, the metal part (1) to be treated is connected to the negative electrical pole of the current generator and the electrolytic medium is connected to the positive electrical pole of the current generator. The inclusion of this step contributes to a better homogeneity of the coating in cases where the metal of the coating has a poor adhesion on the base metal.

The times and voltages or current density of the process will determine the thickness of the coating layer.

The applied electric current can be, simply, a direct electric current defined by a constant voltage or current. Also, it is possible to use more complex electrical currents, such as an alternating current, pulsed currents, etc.

To obtain a homogeneous process and avoid an excess of metallic deposition at the vertices and edges, it is often advisable to work with pulsed current, since in this manner, the deposition is better distributed over the entire surface of the part. In an even more preferred embodiment, a pulsed electric current is used that can be divided into four sections, in which the voltages applied to the part are: negative, zero, positive, zero. Each section has times that are adjustable and independent with respect to one another.

| Section | Voltage | Time |
|---|---|---|
| 1 | $V_-$ | $t_1$ |
| 2 | 0 | $t_2$ |
| 3 | $V_+$ | $t_3$ |
| 4 | 0 | $t_4$ |

This freedom of selection of parameters and times allows playing with the polarization times of the most exposed areas vs. the innermost areas.

For example, under direct current conditions, the outermost parts are usually finished with a thicker coating. It is possible to obtain more homogeneous coatings using these polarization times.

The outermost areas polarize more quickly, so it is possible to oxidise or passivate the outermost areas partially during the positive time, which reduces their activity during the negative stage, thus equalizing the activity of outer parts vs. inner parts, obtaining homogeneous coatings.

Conceptually, two different types of processes can be established depending on the initial state of the metal to be deposited to make the coating.

- In a first type of process, the metal to be deposited is in the form of metal cations in the solid electrolyte and the cathode is formed by an inert material that is not affected (or is affected very little) during the process. In this case, the cathode is not consumed during the process. The solid electrolyte reduces the concentration of metal cations as the process progresses, so the cations must be replaced or the electrolyte changed from time to time.
- In a second type of process, the metal to be deposited is in metallic form at the anode, although it can also, in a complementary manner, be in the form of metal cations in the solid electrolyte. During the process, the metal of the anode oxidises, to form metal cations in the solid electrolyte that will be deposited on the cathode. In this case, the anode is consumed in the process to the same extent that the metal is deposited.

Electrolytic Medium

The electrolytic medium for electrodeposition of a metal on a metal part object of the invention comprises:

- A set of solid particles that retain a conductive solution comprising metal cations.

The set of particles should preferably behave as one among themselves and with respect to the surface to be polished. Therefore, preferably, the particles have a spheroidal or spherical shape. In this way, a fluid and uniform movement across the surfaces of the part to be treated is achieved.

Other particle shapes that can also behave like a fluid are cylinders, bars, lenticular shapes, among others.

Preferably, the set of particles has a distribution of sizes the mean diameter of which is between 0.1 and 1 mm. This range ensures optimal surface finishes and coatings. Although other sizes can be used, larger sizes do not reach cavities and interior parts of angles. Smaller sizes have less fluidity, which can result in worse finishes.

The mechanism for the retention of the conductive solution in the particles can be in cavities, porosities, in the very structure of the material, such as, for example, in interlaminar spaces, or in a gel-type structure. The amount of liquid absorbed must be sufficient for the set of particles to have a measurable electrical conductivity between them. This amount depends on the type and structure of the material of the particles.

Preferably, solid particles that retain a conductive solution comprising metal cations are not supersaturated and therefore do not have liquid.

The ion exchange resin particles can have a porous structure or a gel structure. For processes in which high speed is required, a porous structure is preferable, since exudates are favored, which increases the effective contact area. For processes that require high quality and uniform finishes, and for parts with complicated geometries, the use of ion exchange resins with a gel-type structure is preferable. It is also preferable for obtaining thin homogeneous layers.

The material of the particles must be capable of retaining liquid within it. Furthermore, it must be stable to oxidation and reduction in the range of voltages and/or currents of the electrochemical process. As the conductive solution usually contains aggressive reagents, such as strong acids or bases, the material must be chemically resistant. It must also have certain mechanical stability, Since they are subjected to vibration and the rubbing of the part to be polished during the process.

Certain polymeric materials meet all of these characteristics. In a preferred embodiment, the particles are made of ion exchange resin, since in this way they have the capacity to easily retain and transport metal ions. Preferably, they are cation exchange resins, among these, those based on strong or weak acid groups are preferred, such as sulfonic acid/sulfonate or carboxylic acid/carboxylate type groups. These functional groups have the ability to retain the metal ions to be deposited while maintaining a certain equilibrium with the retained conductive solution. Preferably the ion exchange resins are based on styrene/divinylbenzene-, acrylate- or methacrylate-based polymers and derivatives.

In other preferred formulations, the particles are chelating ion exchange resins. These resins have the advantage of selectively retaining the different metal cations, which in certain cases helps to carry out a more controlled metallic deposition. These resins are capable of retaining traces of other metals present in the conductive solution that are not to be deposited, thus ensuring greater chemical homogeneity of the coating formed. Among the preferred functional groups of these resins are the iminodiacetic, aminophosphonic, polyamine, 2-picolylamine, thiourea, amidoxime, isothiouronium, bispicolylamine groups, since they have a high affinity for transition metals.

It is also possible to formulate the solid electrolyte particles with ion exchange resins with amino groups, either primary, secondary, tertiary, and even quaternary ammonium. These formulations are especially useful for metals that are sensitive to acidic pH and that require working with neutral media or basic media, for example, to coat cobalt.

The conductive solution retained in the particles comprises a solvent liquid and metal ions of the metal to be deposited dissolved in the liquid, in such a way that the solution presents conductivity.

Preferably, the solvent liquid, the conductive solution, is water (aqueous solution). Other liquids can be used, such as organic polar solvents such as methanol, ethanol, DMSO, DMF; among others, ionic liquids, etc. Surfactants derived from sulfonate, polyglycols, alkyl ethers, etc.

The conductive liquid preferably includes, as metal ions, cations of the metal to be deposited on the part. These cations can come from a salt dissolved in a solvent liquid. The presence of a salt, acid, or additional base is also usually appropriate to provide greater electrical conductivity to the electrolytic medium.

As explained, the electrolytic medium object of this invention is not a continuous medium since it is formed by a set of particles. Consequently, between the particles there is an interstitial space between them.

So as to not interfere with the redox process, there is a non-conductive medium (5) in this interstitial space. This non-conductive medium (5) can be gaseous (air, nitrogen, argon, etc.) or liquid (hydrocarbons, silicone, solvents, etc.).

A flow of the non-conductive medium comprised in the interstitial space can be established to regulate the humidity and temperature of the electrodeposition process, resulting in greater control and stability of the process.

In the absence of liquid in the interstitial space, the set of particles behaves like a granular material.

Device

The devices necessary to carry out a dry electrodeposition process by means of solid electrolyte particles have particular characteristics that differentiate them from liquid electrodeposition devices. They must provide a potential difference from a power source between the part and the opposite electrode, as well as ensure that a relative movement of the particles with respect to the metallic surface of the part is maintained during the process.

Relative motion is necessary since, if the solid electrolyte particles are stationary on the surface, only metallic deposition occurs at the contact points, resulting in non-homogeneous finishes. The set of particles behaves like a granular or fluid material, therefore the process obtains better finishes if the set of particles is fluidized by means of vibration or the injection of a fluid, such as a gas or liquid. It is also possible to cause relative movement by moving the part in the set of particles, among other possible ways.

The device has means for providing electrical connectivity to the part or parts to be treated with a power source.

A device for carrying out an electrodeposition process by means of a solid electrolyte comprises at least:

- A power source
- Connection means (2) for connecting a part (1) to be treated to the power source
- An electrode (3) connected to the pole opposite to that of the part to be treated
- A system for producing a relative movement between the part and the free solid particles (4) of the electrolytic medium The power source must be capable of providing a significant potential difference between the part to be coated and the electrode.

The power source is capable of producing positive and negative current pulses in which the deposition speed can be modified and maximum depositions at the edges avoid, as well as controlling the chemical composition in the case of co-deposition of two or more metals at the same time.

The part to be polished receives a connection from the power source by means of a firm and fixed connection or a connection without clamping of the part. A fixed connection can be achieved, for example, by means of the use of tweezers or hanging the part on a frame. A connection without clamping of the part can be achieved, for example, by means of placing several parts in a drum or tray, with an electrode that may be contacting the set of parts.

The anode can be made of the same metal as the coating to be formed. In this case, the oxidation of the anode produces the metal ions simultaneously with the deposition by reduction of the cations at the cathode. In this way, the concentration of cations in the electrolytic medium is kept constant.

Alternatively, the anode can be made of an inert material, such as carbon or an insoluble metal. Oxidation at the anode produces oxygen or other species. The cations of the coating metal must be present in the set of particles from the start in a sufficient concentration. Periodically, more ions must be added to the medium, or the medium must be replaced with a new one.

This device includes a system to produce a relative movement between the part to be treated and the particles in the medium. This movement can have different magnitudes and/or be a combination of several of them.

Preferably the device includes a system for fluidizing the set of particles. Preferably this system includes vibration of the container for the set of particles. Since the set of particles behaves like a granular material, it is very effective at dissipating energy and vibration, therefore, this system is preferably complemented with a vibration of the part to be treated. This vibration of the part ensures that the residence time of the particles at the same point on the surface of the part is limited.

Optionally, the device includes air blowers in the electrolytic medium formed by the set of particles that helps to fluidize and imbibe the system. The blown air can be used to maintain the conditions of the system, either the humidity, temperature, etc.

Preferably, the device has means for the part to make a displacement of one centimeter or more in the medium of particles. This movement can be a circular translation movement, a linear movement, a vertical or horizontal oscillatory movement, among others. Ideally, the applied movement corresponds to the geometry of the part.

Preferably, the movement of the part in the tank is a circular translation movement in a horizontal plane, combined with an oscillatory movement in a vertical plane. Preferably the device is capable of regulating the speed of the different movements independently.

DESCRIPTION OF THE DRAWINGS

Figure 2:
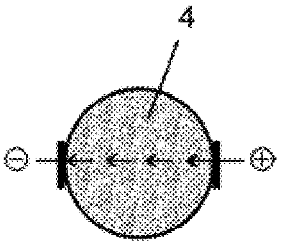
FIG. 2 shows a schematic depiction of a particle forming the solid bodies of the process, according to the invention, where its porous configuration and electrolyte liquid retention capacity that makes it electrically conductive can be seen.
Figure 3:
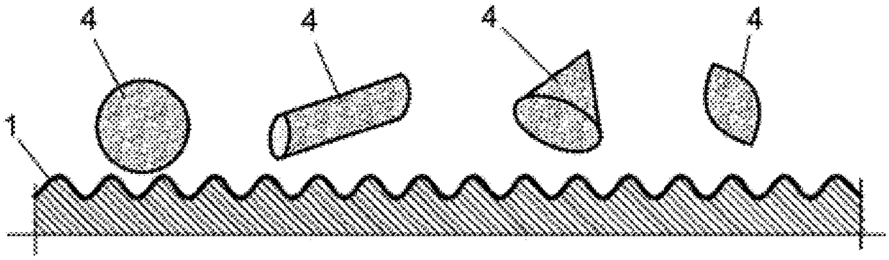
FIG. 3 shows a schematic depiction of a portion of the surface of the part to be treated and several examples of the possible shapes that the particles used in the process can have; and finally.
Figure 4:
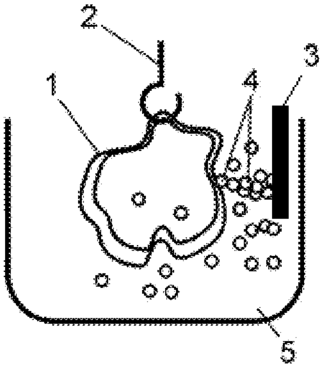
FIG. 4 shows a diagram similar to the one depicted in FIG. 1 where a group of particles forms an electrical bridge of direct contact between the anode and the cathode.
Figure 5:
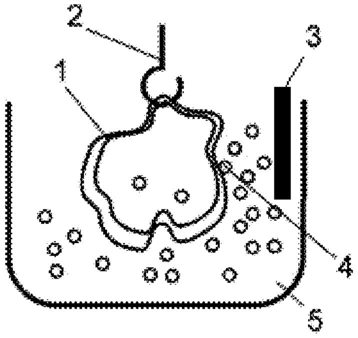
FIG. 5 shows a diagram similar to the one depicted in FIG. 1 where the particles rub against the surface of the part in an isolated manner.

To complement the description that is being made and for the purpose of helping to better understand the features of the invention, a sheet of drawings has been attached to the present specification, as an integral part thereof, wherein the following has been depicted in an illustrative and non-limiting manner:

FIG. 1 shows a schematic depiction of the main elements involved in the electrodeposition process for electrodeposition of metals by ion transport by means of free solid bodies, object of the invention;

FIG. 2 shows a schematic depiction of a particle forming the solid bodies of the process, according to the invention, where its porous configuration and electrolyte liquid retention capacity that makes it electrically conductive can be seen;

FIG. 3 shows a schematic depiction of a portion of the surface of the part to be treated and several examples of the possible shapes that the particles used in the process can have; and finally FIGS. 4 and 5 show respective diagrams similar to the one depicted in FIG. 1, showing respective moments of the process, where the moment of FIG. 4 is the case where a group of particles forms an electrical bridge of direct contact between the anode and the cathode, and FIG. 5 is another case where the particles rub against the surface of the part in an isolated manner.

EXEMPLARY EMBODIMENTS OF THE INVENTION

In a preferred embodiment, the electrolytic medium is formed by 0.1 to 1 mm spheres of ion exchange resin that retain a conductive aqueous solution containing cations of the metal to be deposited. Preferably, the ion exchange resin is a cation exchange resin. In a preferred formulation, the concentration of metal in the conductive solution retained in the particles is in a range going from 0.1 g of metal in 1 L of solution to 500 g of metal in 1 L of solution.

Examples of compositions of the aqueous solution retained by the ion exchange resin particles to deposit different metals are set forth below.

Dry Nickel Electrodeposition

For nickel electrodeposition, nickel(II) salts in an acidic medium are used. Preferably, the nickel salts used are nickel(II) sulfate $Ni(SO_4)$, nickel(II) chloride $NiCl_2$ or nickel(II) sulfamate $Ni(SO_3NH_2)_2$.

Dry Zinc Electrodeposition

For zinc electrodeposition, zinc(II) salts in an acidic medium are used. Preferably, the zinc salts used are zinc(II) chloride $ZnCl_2$.

Dry Gold Electrodeposition

For gold electrodeposition, gold(III) salts in a cyanide medium are used. Preferably, the gold salts used are gold(III) chloride $AuCl_3$ or gold cyanide $AuCN_3$.

Dry Silver Electrodeposition

For gold electrodeposition, silver(I) salts in a cyanide medium are used. Preferably, the gold salts used are silver(I) nitrate $AgNO_3$ or silver cyanide AgCN.

Dry Electrodeposition of Copper

For copper electrodeposition, copper(II) salts in an acid medium are used. Preferably, the copper salts used are copper(II) sulfate $CuSO_4$.

Chromium Electrodeposition

One of the most used electrodeposition processes is to form hard chromium coatings. This process in liquid is very inefficient, where more than 80% of the electrical energy is dedicated to producing hydrogen reduction. The use of a solid electrolyte concentrates the electrical density at a few points, which increases efficiency. The use of a solid electrolyte containing chromium to produce a corrosion resistant coating.

Generally, Cr(VI) salts are used to obtain coatings of this type, the present invention uses Cr(III) salts.

The invention claimed is:

1. An electrodeposition process for electrodeposition of a metal on a metal part, comprising the connection of the metal part to be treated to a first electrical pole of a current generator and a second pole opposite the first pole connected to an electrolytic medium through an electrode, characterised in that it comprises a step:

of relative movement of the metal part in relation to a set of free solid particles that retain a conductive solution comprising metal cations of the metal to be deposited charged with a positive electrical charge in a non-conductive environment that causes the reduction of the metal cations of the conductive solution on the surface of the metal part to be treated.

2. The electrodeposition process for electrodeposition of a metal on a metal part, according to claim 1, characterised in that it comprises a step:

of deposition where the metal part to be treated is connected to the negative electrical pole of the current generator and the electrolytic medium is connected to the positive electrical pole of the current generator through the electrode, and a step of control where the polarity of the current generator is reversed, that is, the metal part to be treated is connected to the positive electrical pole of the current generator and the electrolytic medium is connected to the negative electrical pole of the current generator through the electrode.

3. The electrodeposition process for electrodeposition of a metal on a metal part, according to claim 1, characterised in that an electric current applied between the positive pole and the negative pole is a pulsed current.

4. The electrodeposition process for electrodeposition of a metal on a metal part, according to claim 1, characterised in that, at the beginning of the electrodeposition process, the metal ions of the metal to be deposited are located within the solid particles.

5. The electrodeposition process for electrodeposition of a metal on a metal part, according to claim 1, characterised in that, at the beginning of the electrodeposition process, the metal ions of the metal to be deposited are located in the electrode in the form of metal, and during the electrodeposition process, the anode metal oxidises to metal cations in the conductive solution retained within the free solid particles of the electrolytic medium.

6. The electrodeposition process for electrodeposition of a metal on a metal part, according to claim 1, characterised by further comprising:

the electrolytic medium comprises:

the set of free solid particles that retain the conductive solution comprising metal ions of the metal to be deposited; and an interstitial space between the solid particles.

7. The electrodeposition process for electrodeposition of a metal on a metal part, according to claim 1, characterised in that the free solid particles comprise ion exchange resin.

8. The electrodeposition process for electrodeposition of a metal on a metal part, according to claim 1, characterised in that the free solid particles comprise porous ion exchange resin.

9. The electrodeposition process for electrodeposition of a metal on a metal part, according to claim 1, characterised in that the free solid particles comprise gel-type ion exchange resin.

10. The electrodeposition process for electrodeposition of a metal on a metal part, according to claim 1, characterised in that the free solid particles are based on strong or weak acid groups, such as sulfonic acid/sulfonate or carboxylic acid/carboxylate type groups.

11. The electrodeposition process for electrodeposition of a metal on a metal part, according to claim 1, characterised in that the free solid particles are ion exchange resins based on styrene/divinylbenzene-, acrylate- or methacrylate-based polymers and derivatives.

12. The electrodeposition process for electrodeposition of a metal on a metal part, according to claim 1, characterised in that the free solid particles are ion exchange resins based on chelating agents.

13. The electrodeposition process for electrodeposition of a metal on a metal part, according to claim 1, characterised in that the free solid particles are ion exchange resins with amino groups.

14. The electrodeposition process for electrodeposition of a metal on a metal part, according to claim 6, characterised in that there is a non-conducting medium in the interstitial space between the solid particles.

15. The electrodeposition process for electrodeposition of a metal on a metal part, according to claim 10, wherein the strong or weak acid groups are sulfonic acid/sulfonate or carboxylic acid/carboxylate type groups.

* * * * *